(12) United States Patent　　(10) Patent No.: US 9,353,507 B2
Meusburger　　(45) Date of Patent: May 31, 2016

(54) WATER LINE CONTROL SYSTEM AND METHOD

(71) Applicant: General Electric Company, Schenectady, NY (US)

(72) Inventor: Eric Xavier Meusburger, Louisville, KY (US)

(73) Assignee: General Electric Company, Schenectady, NY (US)

( * ) Notice: Subject to any disclaimer, the term of this patent is extended or adjusted under 35 U.S.C. 154(b) by 154 days.

(21) Appl. No.: 14/331,306

(22) Filed: Jul. 15, 2014

(65) Prior Publication Data

US 2016/0017575 A1　　Jan. 21, 2016

(51) Int. Cl.
*E03B 7/04*　　(2006.01)
*E03B 1/04*　　(2006.01)

(52) U.S. Cl.
CPC .... *E03B 7/04* (2013.01); *E03B 1/04* (2013.01)

(58) Field of Classification Search
CPC ..................................... E03B 7/04; E03B 1/04
USPC ......... 137/624.11, 624.12; 251/129.04; 4/623
See application file for complete search history.

(56) References Cited

U.S. PATENT DOCUMENTS

| 6,860,288 | B2 * | 3/2005 | Uhler | F17D 5/06 137/312 |
| 8,367,984 | B2 * | 2/2013 | Besore et al. | G06Q 50/06 219/490 |
| 2004/0206405 | A1 * | 10/2004 | Smith et al. | E03B 7/071 137/624.12 |

FOREIGN PATENT DOCUMENTS

WO　　WO 03/088737 A1　　10/2003

\* cited by examiner

*Primary Examiner* — Kevin Lee
(74) *Attorney, Agent, or Firm* — Dority & Manning, P.A.

(57) ABSTRACT

Water line control systems and methods are provided. A water line control method includes alternately adjusting a power component of an appliance between a normal mode wherein the power component produces a normal power level and a vacation mode wherein the power component produces a reduced power level. The water line control method further includes closing an auxiliary valve when the power component is adjusted to the vacation mode, the auxiliary valve operably connected to a main water line. The water line control method further includes opening the auxiliary valve when the power component is adjusted to the normal mode.

19 Claims, 5 Drawing Sheets

WATER LINE CONTROL SYSTEM AND METHOD

FIELD OF THE INVENTION

The present disclosure is directed generally to control systems and methods for water lines to and within structures, such as residences, particularly during extended periods when the residences are uninhabited.

BACKGROUND OF THE INVENTION

Modern structures which are inhabited by human owners, occupants, etc., typically include a water supply and a variety of appliances. For example, a home or office may include various kitchen appliances, such as a refrigerator, oven, dishwasher, microwave, etc. Additional appliances may include, for example, washing machines, dryers, water heaters, etc. Many of these appliances may be in fluid communication with the water supply to obtain water for use therein. A water heater, for example, may obtain water from the water supply, heat the water, and then supply the heater water to various locations in the residence, such as to other appliances, to sinks and showers, etc.

One concern with modern structures is damage to the water supply, which can cause leakage or flooding in the modern structure. This is of particular concern during extended periods when the residences are uninhabited. For example, when homeowners leave their residences for an extended period of time to, for example, go on vacation, one concern is that a main water line providing water to the residence will be damaged, and that the resulting water flowing from the damaged water line will damage the residence. This water damage can be significant and, in some cases, catastrophic.

Accordingly, improved systems and methods for controlling water lines associated with modern structures are desired. In particular, systems and methods that can reduce the risk of unintended water flow into such modern structures would be advantageous.

BRIEF DESCRIPTION OF THE INVENTION

Aspects and advantages of the invention will be set forth in part in the following description, or may be obvious from the description, or may be learned through practice of the invention.

In accordance with one embodiment, a water line control system is provided. The water line control system includes a main water line, a main shutoff valve operably connected to the main water line, and an appliance. The appliance includes a power component and a controller in communication with the power component. The controller is operable to adjust the power component between a normal mode wherein the power component produces a normal power level and a vacation mode wherein the power component produces a reduced power level. The water line control system further includes an auxiliary valve operably connected to the main water line. The auxiliary valve is in communication with the controller. The controller is further operable to close the auxiliary valve when the power component is adjusted to vacation mode.

In accordance with another embodiment, a water line control method is provided. The water line control method includes alternately adjusting a power component of an appliance between a normal mode wherein the power component produces a normal power level and a vacation mode wherein the power component produces a reduced power level. The water line control method further includes closing an auxiliary valve when the power component is adjusted to the vacation mode, the auxiliary valve operably connected to a main water line. The water line control method further includes opening the auxiliary valve when the power component is adjusted to the normal mode.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
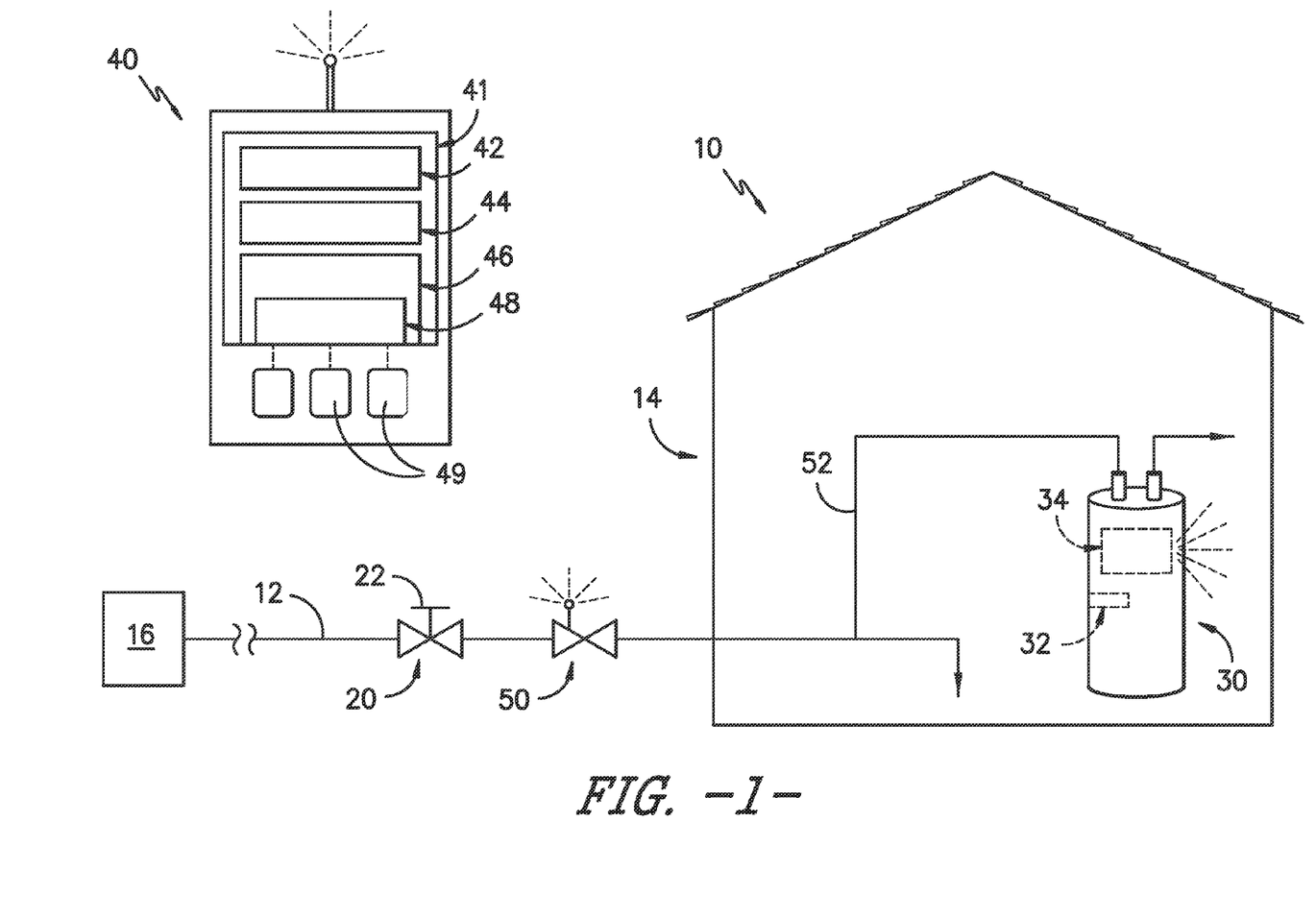
FIG. 1. is a schematic version of a water line control system in accordance with one embodiment of the present disclosure.
Figure 2:
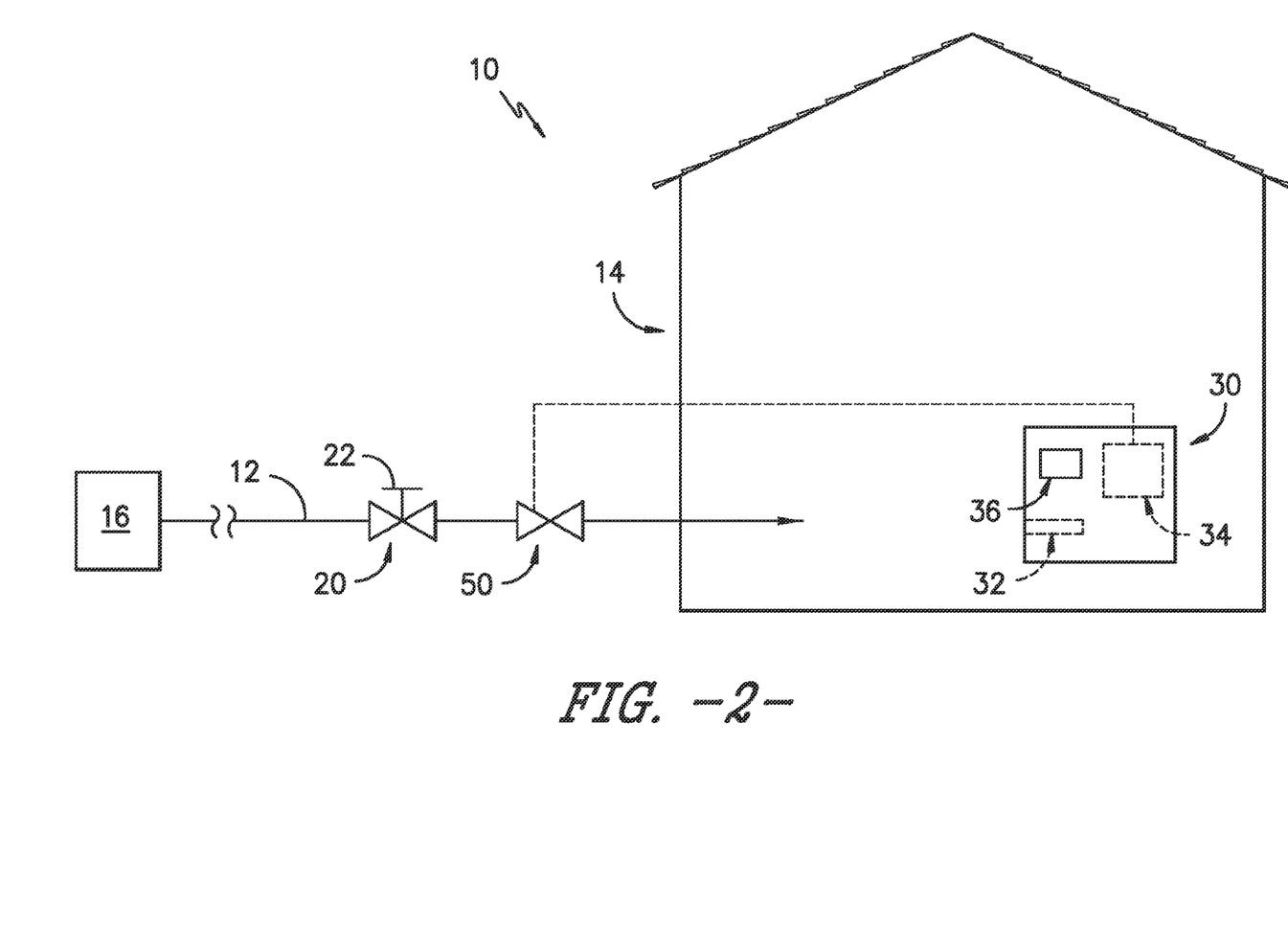
FIG. 2. is a schematic version of a water line control system in accordance with another embodiment of the present disclosure.

Referring now to FIGS. 1 and 2, a water line control system 10 is illustrated. The water line control system 10 generally includes a main water line 12, which may supply water to a structure 14. As will be understood by those skilled in the art and as used herein, the term "water" includes purified water and solutions or mixtures containing water and, e.g., elements (such as calcium, chlorine, and fluorine), salts, bacteria, nitrates, organics, and other chemical compounds or substances. The structure 14 may generally be an inhabitable structure, such as an office building or a residence. In exemplary embodiments, the structure 14 is a residence, such as a house, apartment building, townhouse, etc. Main water line 12 may provide a flow of water from a main water supply 16 to various locations in and components of the structure 14.

System 10 may further include a main shutoff valve 20 operably connected to the main water line 12. The main shutoff valve 20 may be adjustable between an open position and a closed position. In the open position, valve 20 may allow water flow therethrough to the various locations in and components of the structure 14. In the closed position, valve 20 may prevent water flow therethrough, thus further preventing any flow to the various locations in and components of the structure 14. Main shutoff valve 20 may be disposed within or outside of the structure 14, and may be disposed upstream of the various locations in and components of the structure 14. Notably, the terms "upstream" and "downstream" as used herein are utilized with respect to the direction of flow of water, such as through the system 10. Typically, main shutoff valve 20 is manually adjusted between the open position and closed position, such as by turning or otherwise moving a handle 22 thereof. Alternatively, such adjustment may be performed electronically, such as via signals from a controller, etc.

System 10 may further include one or more appliances 30. Each appliance may include a power component 32 and a controller 34. The power component 32 is generally a component that produces power within the appliance 30, and is connected to a power source, such as an electrical outlet, a gas source, etc. For example, an appliance 30 may be a refrigerator, oven, dishwasher, microwave, washing machine, dryer, water heaters, etc. The power component 32 of a refrigerator, for example, may be the motor of the compressor, and/or the component that produces the electricity to run the display on the refrigerator. The power component 32 of an oven may be the component that produces electrical or gas-fueled heat within the oven, and/or the component that produces the electricity to run the display on the oven.

Figure 3:
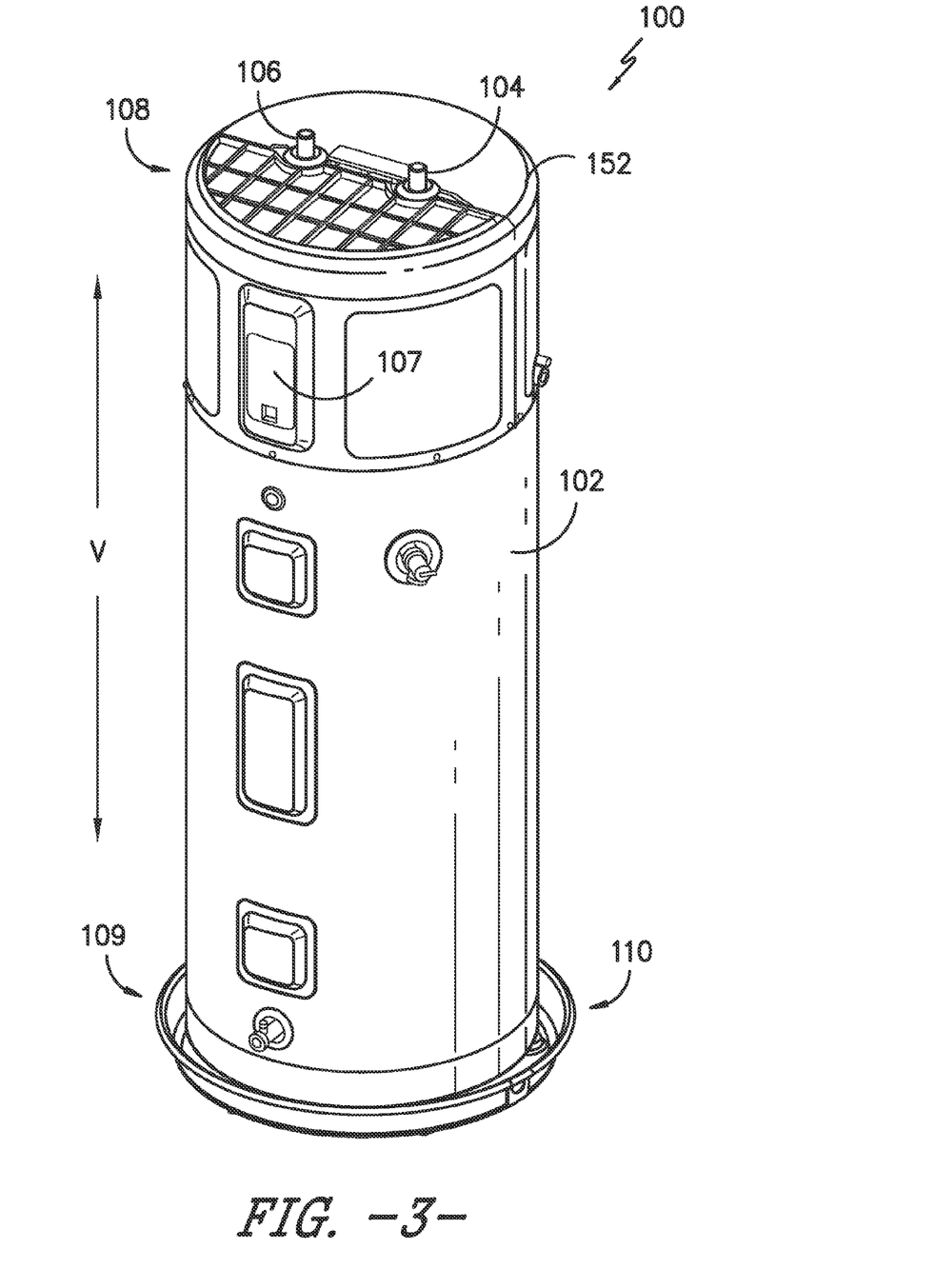
FIG. 3 is a perspective view of a water heater appliance in accordance with another embodiment of the present disclosure.
Figure 4:
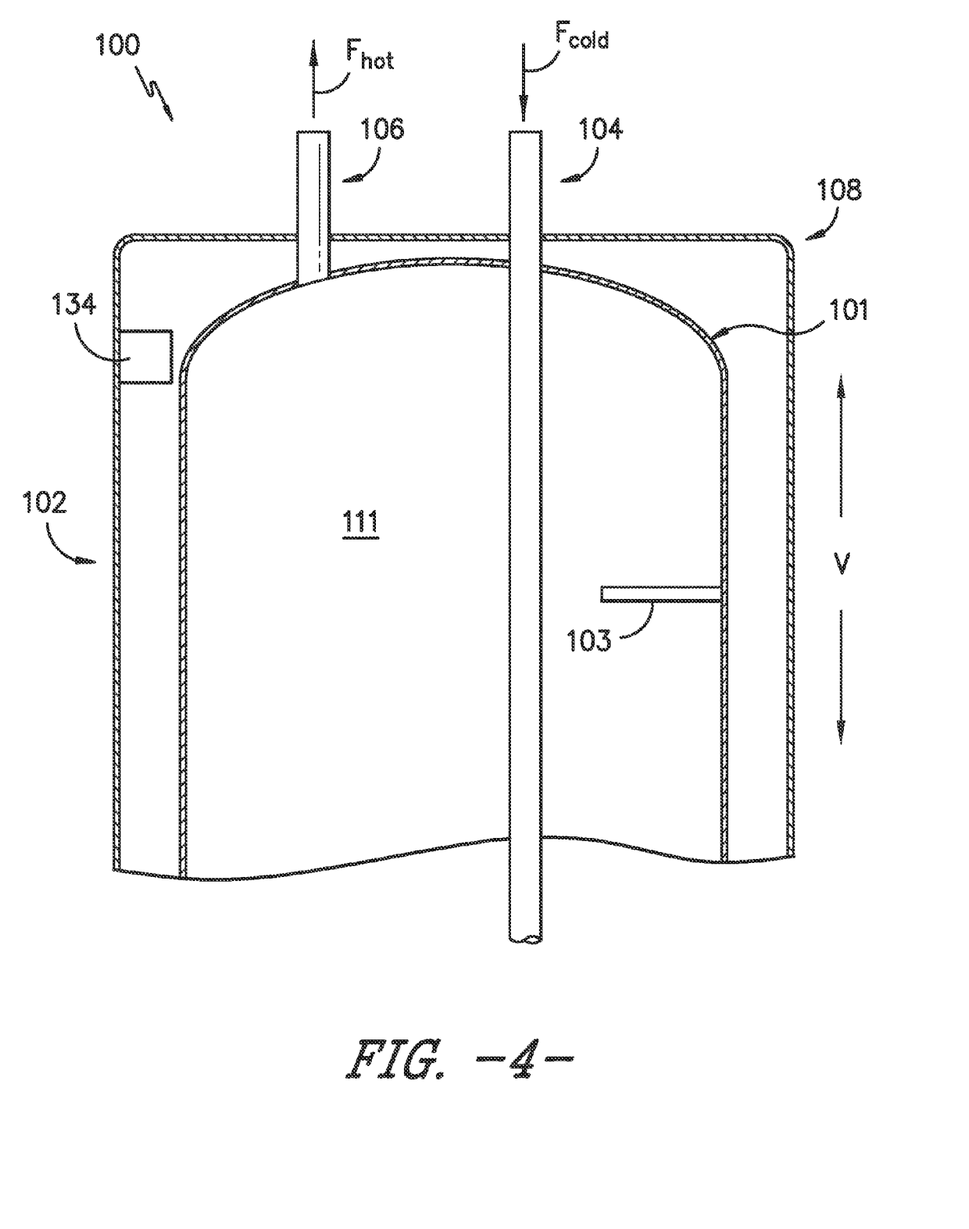
FIG. 4 is a cross-sectional view of a portion of a water heater appliance in accordance with another embodiment of the present disclosure.

In one particular embodiment, the appliance 30 may be a water heater 100, as illustrated in FIGS. 3 and 4. FIG. 3 provides a perspective view of a water heater appliance 100 according to an exemplary embodiment of the present subject matter. Water heater appliance 100 includes a casing 102. A tank 101 (FIG. 4) and heating elements 103 (FIG. 4) are positioned within casing 102 for heating water therein. Heating element 103 may be the power component 32 of the water heater 100. Heating elements 103 may include a gas burner, a heat pump, an electric resistance element, a microwave element, an induction element, or any other suitable heating element or combination thereof.

Water heater appliance 100 also includes a cold water conduit 104 and a hot water conduit 106 that are both in fluid communication with a chamber 111 (FIG. 4) defined by tank 101. As an example, cold water from a water source, e.g., a municipal water supply or a well, can enter water heater appliance 100 through cold water conduit 104 (shown schematically with arrow labeled $F_{cold}$ in FIG. 4). As discussed herein, cold water may be flowed to cold water conduit 104 from a supply line which is in fluid communication with main water line 12. From cold water conduit 104, such cold water can enter chamber 111 of tank 101 wherein it is heated with heating elements 103 to generate heated water. Such heated water can exit water heater appliance 100 at hot water conduit 106 (shown schematically with arrow labeled $F_{hot}$ in FIG. 4) and, e.g., be supplied to a bath, shower, sink, or any other suitable component of a structure 14.

Water heater appliance 100 extends longitudinally between a top portion 108 and a bottom portion 109 along a vertical direction V. Thus, water heater appliance 100 is generally vertically oriented. Water heater appliance 100 can be leveled, e.g., such that casing 102 is plumb in the vertical direction V, in order to facilitate proper operation of water heater appliance 100. A drain pan 110 is positioned at bottom portion 109 of water heater appliance 100 such that water heater appliance 100 sits on drain pan 110. Drain pan 110 sits beneath water heater appliance 100 along the vertical direction V, e.g., to collect water that leaks from water heater appliance 100 or water that condenses on an evaporator (not shown) of water heater appliance 100. It should be understood that water heater appliance 100 is provided by way of example only and that the present subject matter may be used with any suitable water heater appliance, including for example a heat pump water heater appliance.

Referring to FIG. 4, water heater appliance 100 may further include a controller 134 that is configured for regulating operation of water heater appliance 100. Controller 134 may be in operative communication with various components of the water heater appliances, including, for example, heating elements 103, temperature sensors (not shown), and a control panel 107 (see FIG. 3). Control panel 107 may include various displays and input controls for user interface with the appliance 100. Controller 134 can, for example, selectively activate heating elements 103 in order to heat water within chamber 102 of tank 101.

Referring again to FIGS. 1 and 2, and as discussed, appliance 30 may generally include a controller 34, such as controller 134 in the case of a water heater appliance 100. Controller 34 includes memory and one or more processing devices such as microprocessors, CPUs or the like, such as general or special purpose microprocessors operable to execute programming instructions or micro-control code associated with operation of the appliance 30. The memory can represent random access memory such as DRAM, or read only memory such as ROM or FLASH. The processor executes programming instructions stored in the memory. The memory can be a separate component from the processor or can be included onboard within the processor. Alternatively, controller 34 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

The controller 34 may be in communication with the power component 32, such as through a suitable wired or wireless connection. A wired connection may be facilitated via suitable electrical wiring, as is generally understood. A wireless connection may, for example, via any suitable wireless network (WPAN, WLAN, wireless mesh network, Wireless MAN, Wireless WAN, a cellular network, GAN, etc.), as is generally understood. Further, the controller 34 may be operable to adjust the power component 32 between a normal mode and a vacation mode. In the normal mode, the power component 32 may generally produce a normal power level. For example, the power component 32 may be capable of producing a maximum power amount when in the normal mode. Normal mode may generally be utilized during typical operation of the appliance 30 by a user thereof, and the appliance 30 may be kept in normal mode during typical days when, for example, the structure 14 is being generally utilized. Vacation mode may be a reduced power mode. In the vacation mode, the power component 32 may produce a reduced power level. For example, the power component 32 may be only capable of producing a reduced maximum power amount when in the vacation mode that is less than the maximum power amount when in the normal mode. Similarly, typical power outputs, such as standby power outputs, may be reduced when in the vacation mode relative to the outputs when in the normal mode. In one specific embodiment, the power output of heating element 103 of a water heater appliance 100 may warm water within the appliance 100 to a lower temperature when in the vacation mode than the standard set temperature when in the normal mode. Vacation mode may generally be utilized when, for example, the structure 14 is going to be uninhabited for an extended period of time, such as a span of two or more days. One typical use is when owners or renters of a residence go on vacation.

In some embodiments, as illustrated in FIG. 2, controller 34 may be in communication, such as wired or wirelessly, with a user input 36 of the appliance 30. User input 36 may be a switch, touchscreen, button, knob or other suitable component on the appliance 30 that allows a user to input a selection to the controller 34. In these embodiments, a user may manipulate the user input 36 to send a signal from the controller 34 to the power supply 32 to adjust the power supply 32 to the vacation mode and to the normal mode.

Additionally or alternatively, as illustrated in FIG. 1, system 10 may include a user interface device 40. The user interface device 40 may be separate from the appliance 30, and may be in wired or wireless communication with, for example, the controller 34 thereof. For example, user interface device 40 may be a computer (such as a desktop computer or a laptop), a tablet, a personal telephone (such as a suitable smartphone), a television (such as a smart television) or an independent device which functions solely to operate and communicate with various other components of the system 10.

User interface device 40 may include a controller 41. The controller 41 may include one or more processor(s) 42 and associated memory device(s) 44 configured to perform a variety of computer-implemented functions (e.g., performing the methods, steps, and the like disclosed herein). Additionally, the controller 41 may also include a communications module 46 to facilitate communications between the device 40 and the controller 34 and/or other suitable component of the system 10. For instance, the communications module 46 may serve as an interface to permit the controller 41 to transmit and/or receive information. Moreover, the communications module 46 may include an interface 48 (e.g., one or more analog-to-digital converters) to permit input signals to be converted into signals that can be understood and processed by the processor 42. The interface 48 may include or be in communication with input selectors 49 of the device 40, through which a user may provide various inputs as desired.

An input selector 49 may be a switch, touchscreen, button, knob or other suitable component on the user interface device 40 that allows a user to input a selection to the controller 41. A user may manipulate an input selector 49 to send a signal from the user interface device 40 to the controller 34 and power supply 32 to adjust the power supply 32 to the vacation mode and to the normal mode.

Referring still to FIGS. 1 and 2, system 10 may further include an auxiliary valve 50. Auxiliary valve 50 may be operably connected to the main water line 12. Such operable connection may in exemplary embodiments be downstream of the main shutoff valve 20 as shown, or alternatively may be upstream of the main shutoff valve 20. Auxiliary valve 50 may be adjustable between an open position and a closed position. In the open position, valve 50 may allow water flow therethrough to the various locations in and components of the structure 14. In the closed position, valve 50 may prevent water flow therethrough, thus further preventing any flow to the various locations in and components of the structure 14. Auxiliary valve 50 may be disposed within or outside of the structure 14, and may be disposed upstream of the various locations in and components of the structure 14.

Notably, in some embodiments, appliance 30 may be in fluid communication with the main water line 12, for example downstream of the main shutoff valve 20. In particular, in some embodiments as illustrated for example in FIG. 1, a supply line 52 may be disposed between and provide the fluid communication between the appliance 30 and the main water line 12. For example, in the case of a water heater appliance 100, supply line 52 may flow water from the main water line 12 to the cold water conduit 104. The auxiliary valve 50 may be operably connected to the main water line 12 upstream of the supply line 52, such as between the main shutoff valve 20 and the supply line 52. In other embodiments as illustrated in FIG. 2, appliance 30 need not be in fluid communication with the main water line 12.

Auxiliary valve 50 may be in communication with the controller 34. For example, in exemplary embodiments, the auxiliary valve 50 is a solenoid valve. Alternatively, however, any suitable electronically adjustable valve 50 is within the scope and spirit of the present disclosure. The controller 34 may be in communication with the auxiliary valve 50 through a suitable wired or wireless connection. For example, FIG. 1 illustrates a wireless connection, wherein the auxiliary valve 50 is in wireless communication with the controller 34, while FIG. 2 illustrates a wired connection, wherein the auxiliary valve 50 is in wired communication with the controller 34.

The controller 34 may advantageously be operable to close the auxiliary valve 50 when the power component 32 is adjusted to vacation mode. For example, as discussed, the power component 32 may be adjusted to vacation mode from normal mode, such as via an input from a user to a user input 36 or input selector 49. When this adjustment occurs, the controller 34 may further operate to close the auxiliary valve 50. Advantageously, such operation to close the auxiliary valve 50 thus prevents water from flowing past the auxiliary valve 50 when the power component 32 is in vacation mode. Accordingly, the risk of damage which would cause leaking or flooding in the structure 14 is reduced or eliminated, and this advantageously occurs during periods when the structure 14 is likely uninhabited.

In some embodiments, the controller 34 may automatically close the auxiliary valve 50 when the controller 34 adjusts the power component 32 to the vacation mode, and no additional input may be required. For example, upon receiving a signal to adjust the power component 32 to the vacation mode, the controller 34 may automatically send such signal to the power component 32 and also send a signal to close the auxiliary valve 50. The signal may be sent directly or indirectly to the valve 50.

In other embodiments, the controller 34 may send a request signal to the user interface device 40 when the controller 34 adjusts the power component 32 to the vacation mode. The user interface device 40 may then, upon receipt of this signal, await confirmation by a user that the auxiliary valve 50 should be closed. The user may manipulate the input selector 49 to provide such confirmation, and a confirmation signal may then be sent from the user interface device 40 to the controller 34. Upon receiving the confirmation signal from the user interface device 40, the controller 34 may close the auxiliary valve 50 by sending a signal to close the auxiliary valve 50.

In some embodiments, controller 34 may further be operable to open the auxiliary valve 50 when the power component 32 is adjusted to normal mode. For example, as discussed, the power component 32 may be adjusted to normal mode from vacation mode, such as via an input from a user to a user input 36 or input selector 49. When this adjustment occurs, the controller 34 may further operate to open the auxiliary valve 50. Advantageously, such operation to open the auxiliary valve 50 thus allows water from flowing past the auxiliary valve 50 when the power component 32 is in normal mode.

In some embodiments, the controller 34 may automatically open the auxiliary valve 50 when the controller 34 adjusts the power component 32 to the normal mode, and no additional input may be required. For example, upon receiving a signal to adjust the power component 32 to the normal mode, the controller 34 may automatically send such signal to the power component 32 and also send a signal to open the auxiliary valve 50. The signal may be sent directly or indirectly to the valve 50.

In other embodiments, the controller 34 may send a request signal to the user interface device 40 when the controller 34 adjusts the power component 32 to the normal mode. The user interface device 40 may then, upon receipt of this signal, await confirmation by a user that the auxiliary valve 50 should be opened. The user may manipulate the input selector 49 to provide such confirmation, and a confirmation signal may then be sent from the user interface device 40 to the controller 34. Upon receiving the confirmation signal from the user interface device 40, the controller 34 may open the auxiliary valve 50 by sending a signal to open the auxiliary valve 50.

Figure 5:
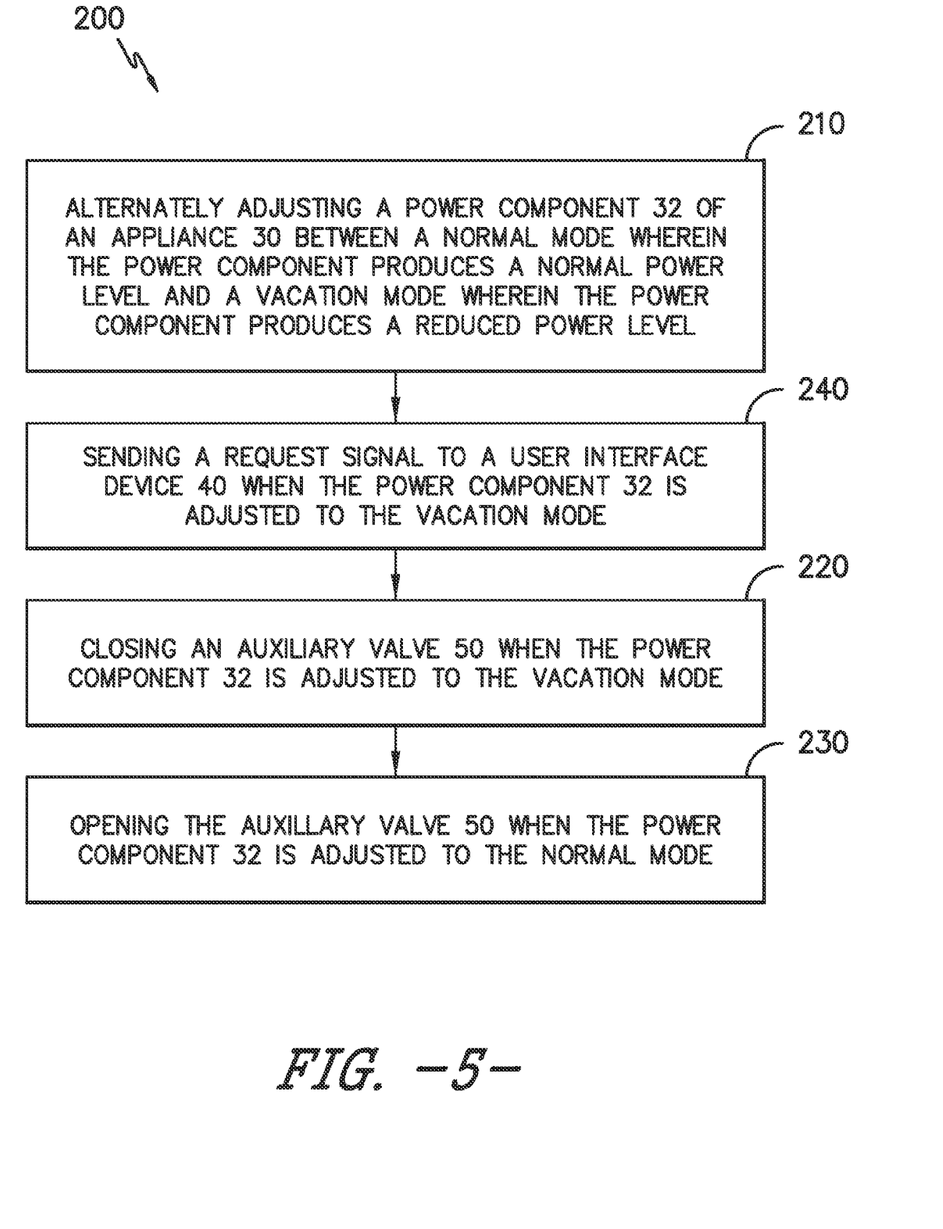
FIG. 5 is a flow chart illustrating a water line control method in accordance with one embodiment of the present disclosure.

As illustrated in FIG. 5, the present disclosure is further directed to water line control methods 200. It should be noted that controller 34 may, for example, be operable to perform the various steps of a method 200 as discussed herein. Method 200 may include, for example, the step 210 of alternately adjusting a power component 32 of an appliance 30 between a normal mode wherein the power component produces a normal power level and a vacation mode wherein the power component produces a reduced power level, as discussed herein. Method 200 may further include the step 220 of closing an auxiliary valve 50 when the power component 32 is adjusted to the vacation mode, the auxiliary valve 50 operably connected to a main water line 12 downstream of a main shutoff valve 20, as discussed herein. Method 200 may further include, for example, the step 230 of opening the auxiliary valve 50 when the power component 32 is adjusted to the normal mode, as discussed herein.

In some embodiments, the closing step and/or opening step may be performed automatically when the power component 32 is adjusted to the vacation mode, as discussed herein. In other embodiments as illustrated, a method 200 according to the present disclosure may include the step 240 of sending a request signal to a user interface device 40 when the power component 32 is adjusted to the vacation mode. The closing step 220 may occur when a confirmation signal is received from the user interface device 40. Further, a method may include the step of sending a request signal to a user interface device 40 when the power component 32 is adjusted to the normal mode. The opening step 230 may occur when a confirmation signal is received from the user interface device 40.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A water line control system, the system comprising:
   a main water line;
   a main shutoff valve operably connected to the main water line;
   an appliance, the appliance comprising a power component and a controller in communication with the power component, the controller operable to adjust the power component between a normal mode wherein the power component produces a normal power level and a vacation mode wherein the power component produces a reduced power level; and
   an auxiliary valve operably connected to the main water line, the auxiliary valve in communication with the controller, the controller further operable to close the auxiliary valve when the power component is adjusted to vacation mode and with no additional sensor input to the controller.

2. The water line control system of claim 1, wherein the controller automatically closes the auxiliary valve when the controller adjusts the power component to the vacation mode.

3. The water line control system of claim 1, further comprising a user interface device, wherein the controller sends a request signal to the user interface device when the controller adjusts the power component to the vacation mode, and wherein the controller closes the auxiliary valve after receiving a confirmation signal from the user interface device.

4. The water line control system of claim 3, wherein the user interface device is in wireless communication with the controller.

5. The water line control system of claim 1, wherein the controller is further operable to open the auxiliary valve when the power component is adjusted to normal mode.

6. The water line control system of claim 1, wherein the appliance is in fluid communication with the main water line downstream of the main shutoff valve.

7. The water line control system of claim 6, wherein a supply line provides the fluid communication between the appliance and the main water line, and wherein the auxiliary valve is operably connected to the main water line upstream of the supply line.

8. The water line control system of claim 1, wherein the auxiliary valve is in wireless communication with the controller.

9. The water line control system of claim 1, wherein the auxiliary valve is a solenoid valve.

10. The water line control system of claim 1, wherein the appliance is a water heater.

11. The water line control system of claim 1, wherein the auxiliary valve is downstream of the main shutoff valve.

12. A water line control method, the method comprising:
    alternately adjusting a power component of an appliance between a normal mode wherein the power component produces a normal power level and a vacation mode wherein the power component produces a reduced power level;
    closing an auxiliary valve when the power component is adjusted to the vacation mode and with no additional sensor input, the auxiliary valve operably connected to a main water line; and
    opening the auxiliary valve when the power component is adjusted to the normal mode and with no additional sensor input.

13. The method of claim 12, wherein the closing step is performed automatically when the power component is adjusted to the vacation mode.

14. The method of claim 12, further comprising sending a request signal to a user interface device when the power component is adjusted to the vacation mode, and wherein the closing step occurs when a confirmation signal is received from the user interface device.

15. The method of claim 12, wherein the appliance is in fluid communication with the main water line downstream of the main shutoff valve.

16. The method of claim 15, wherein a supply line provides the fluid communication between the appliance and the main water line, and wherein the auxiliary valve is operably connected to the main water line upstream of the supply line.

17. The method of claim 12, wherein the auxiliary valve is a solenoid valve.

18. The method of claim 12, wherein the appliance is a water heater.

19. The method of claim 12, wherein the auxiliary valve is operably connected to the main water line downstream of the main shutoff valve.

* * * * *